United States Patent [19]

Bello

[11] Patent Number: 5,329,960
[45] Date of Patent: Jul. 19, 1994

[54] PRESSURE ACTUATED VALVE ASSEMBLY

[76] Inventor: Thomas J. Bello, 130 Kaulana St., Hilo, Hi. 96720

[21] Appl. No.: 159,584

[22] Filed: Dec. 1, 1993

[51] Int. Cl.⁵ ............................................. F16K 31/14
[52] U.S. Cl. ................................. 137/467; 137/495; 137/614; 137/616.7; 251/294; 251/352
[58] Field of Search ............ 137/467, 495, 614, 616.7; 251/294, 349, 352

[56] References Cited

U.S. PATENT DOCUMENTS

| 223,159 | 12/1879 | Neracher | 137/616.7 X |
|---|---|---|---|
| 432,906 | 7/1890 | Scholding | 137/616.7 X |
| 825,570 | 7/1906 | Wirt | 251/349 X |
| 896,995 | 8/1908 | Kates | 137/616.7 |
| 933,290 | 9/1909 | Clay | 251/294 X |
| 1,096,232 | 5/1914 | Foster | 251/352 X |
| 1,255,364 | 2/1918 | Waibel | 251/294 X |
| 1,498,367 | 6/1924 | Ferguson | 251/352 X |
| 2,354,631 | 7/1944 | Williamson | 251/349 X |
| 2,928,647 | 3/1960 | Rusnak | 251/294 X |
| 4,323,219 | 4/1982 | Carlin | 137/467 X |
| 4,527,588 | 7/1985 | Tseo | 251/349 X |
| 4,978,100 | 12/1990 | Peurifoy | 251/8 |
| 5,044,445 | 9/1991 | Kayahara | 169/52 |
| 5,103,852 | 4/1992 | Jones et al. | 251/294 X |

FOREIGN PATENT DOCUMENTS 2418374 10/1979 France .
1499167 1/1978 United Kingdom .

Primary Examiner—John Rivell
Attorney, Agent, or Firm—Richard C. Litman

[57] ABSTRACT

Disclosed is a valve assembly in which a valve is actuated by a flexible high pressure hose in cooperation with a commonly attached linkage. The valve assembly is attachable between a fire hose and a source of high pressure fluid. The assembly allows a user to open the valve to the high pressure fluid source from a remote location.

20 Claims, 3 Drawing Sheets

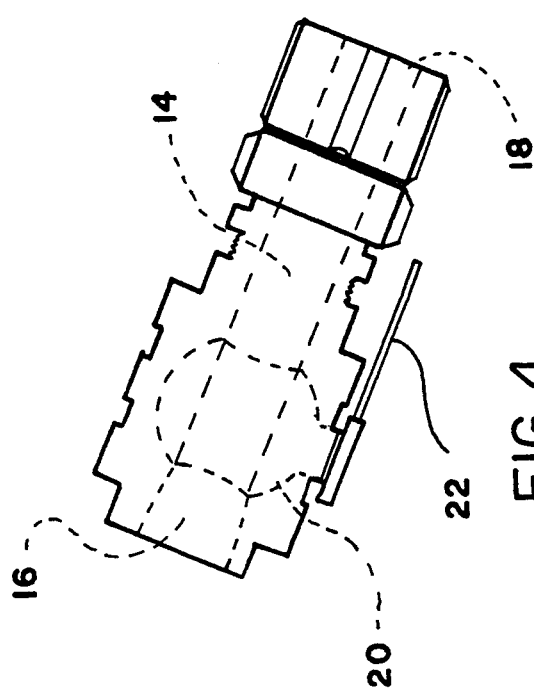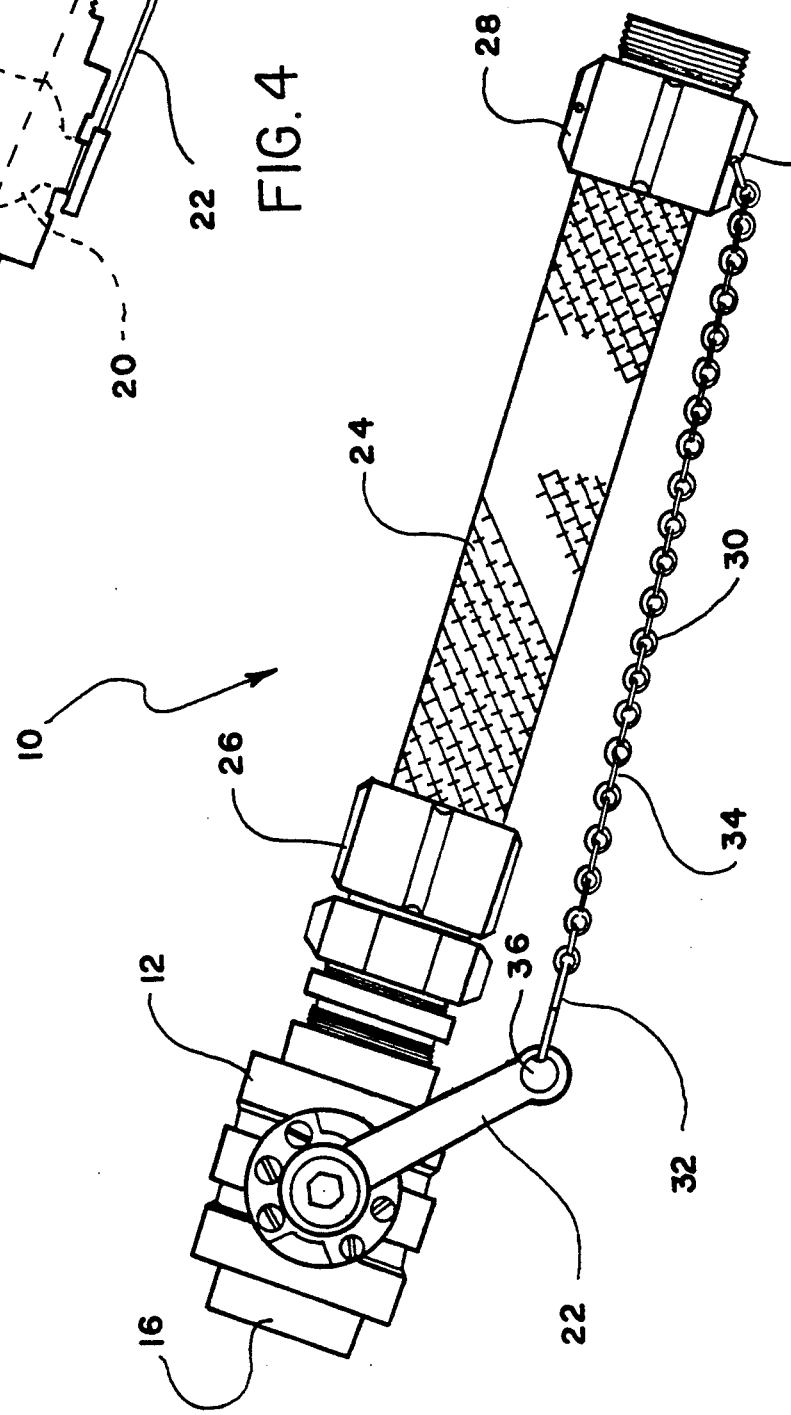

PRESSURE ACTUATED VALVE ASSEMBLY

BACKGROUND OF THE INVENTION

1. Field of the Invention

The present invention relates to a valve assembly actuatable upon introducing a high pressure fluid flow into an attached flexible high pressure hose. The valve assembly is purposed for use in conjunction with fire emergency equipment.

2. Description of the Prior Art

In a fire emergency situation, there are usually few resources available for quickly controlling the spread of a fire hazard or for terminating the fire hazard at its source. Such shortage of resources relate to manpower and/or equipment combatting the fire emergency. A situation may arise where only one person is on hand to combat the fire, or if there are other people around, they may otherwise be occupied with more immediate on-site emergencies, such as rescuing human lives. In a situation where there is only a single individual and the immediate concern is to contain or put-out a fire, the individual must unreel a fire hose and transport the hose, including the fluid release nozzle, to a fire emergency site. This site is most likely at a distant location from where the fire hose originates, that is, where the fire hose was unreeled or the location of the source releasing water into the hose.

Time is also a resource to be used intelligently in an emergency situation. Having a remotely operable valve for releasing water into the fire hose would save time and allow that time to be delegated otherwise. A pressure assisted valve assembly, uncomplicated by electrical controls or compound mechanical parts, and which could be intuitively operated, would be invaluable to a user. Thus, an operation for opening the flow of water through a fire hose, while the user is at a remote location, would help facilitate the rapid and effective operation of extinguishing a fire.

In regard to the above, U.S. Pat. No. 1,255,364, issued to Henry Waibel on Feb. 5, 1918, discloses a water release valve structured and configured to be positively opened by a remote pulling action on a fire hose. Here, the end of the fire hose and its flexible collar are coupled to a valve outlet pipe. A chain is attached to the other end of the flexible collar. The length of the chain passes through a valve casing to a compound valve lever actuator. This compound valve actuator is a multi-membered actuator which opens a valve gate to allow water to flow to through the fire hose. U.S. Pat. No. 933,290, issued to William J. Clay on Sep. 7, 1909, describes a fire hose attached to a reel. The reel is axially mounted on a rotatable valve shaft. The valve connects to a hydrant. A pin associated with the reel is engageable with the valve shaft. With the pin in place, an unreeling of the fire hose would actuate the valve to an open position and allow water to flow to the fire hose.

None of the above inventions and patents, taken either singly or in combination, is seen to describe the instant invention as claimed.

SUMMARY OF THE INVENTION

The flow of a high pressure fluid from a fluid source into a valve assembly actuates a valve from a marginally opened position to a fully open position. The marginally opened position of the valve is achieved by a tug on the hose made by a user holding the hose at a remote location. Prior to tugging on the hose, the hose would not be filled with fluid and therefore, would be flaccid. In a flaccid posture, the hose would be easily positioned and repositioned at the remote site.

After the tug, the high pressure fluid begins to flow into the hose. The transfer-hose member of the valve assembly responds to the increased fluid pressure built up in the hose as the high pressure fluid passes therethrough. A linkage member of the valve assembly responds to the displacement of the transfer-hose from a limp or contracted orientation to a substantially rigidly linear orientation. The linkage becomes taut or stressed as the orientation of the transfer-hose changes. The taut linkage pulls upon the lever member of the valve assembly which, in turn, opens the internal valve of the valve assembly.

The fluid flow continues until the hose is filled with fluid and thereby, opens the internal valve to its full extent. When the hose is filled with the high pressure fluid, the user may release the high pressure fluid from the nozzle at the remote site or location.

Accordingly, it is a principal object of the invention to mechanically actuate a valve to an open position remotely with the assistance of a high pressure fluid permitted to flow through the valve.

It is another object that the valve assembly be permitted to partially open upon a small force delivered to the valve assembly from a remote location which initiates a flow of high pressure fluid through the valve.

It is a further object that the invention be integrateable with contemporary fire hose delivery equipment using standard couplings.

A further object is that the invention have a hose which is initially substantially empty of fluid and flaccid, and thereby easily positionable and repositionable at a remote site.

Still another object is that the invention have modular parts which are readily repairable or replaceable.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

FIG. 3 is a side elevational view of a valve assembly in an open position.

FIG. 4 is a diagrammatic representation of valve in an open position.

Similar reference characters denote corresponding features consistently throughout the attached drawings.

DETAILED DESCRIPTION OF THE PREFERRED EMBODIMENT

Figure 2:
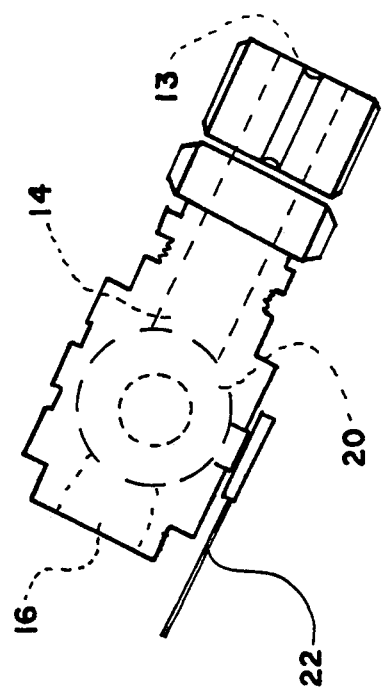
FIG. 2 is a diagrammatic representation of valve in a closed position.
Figure 1:
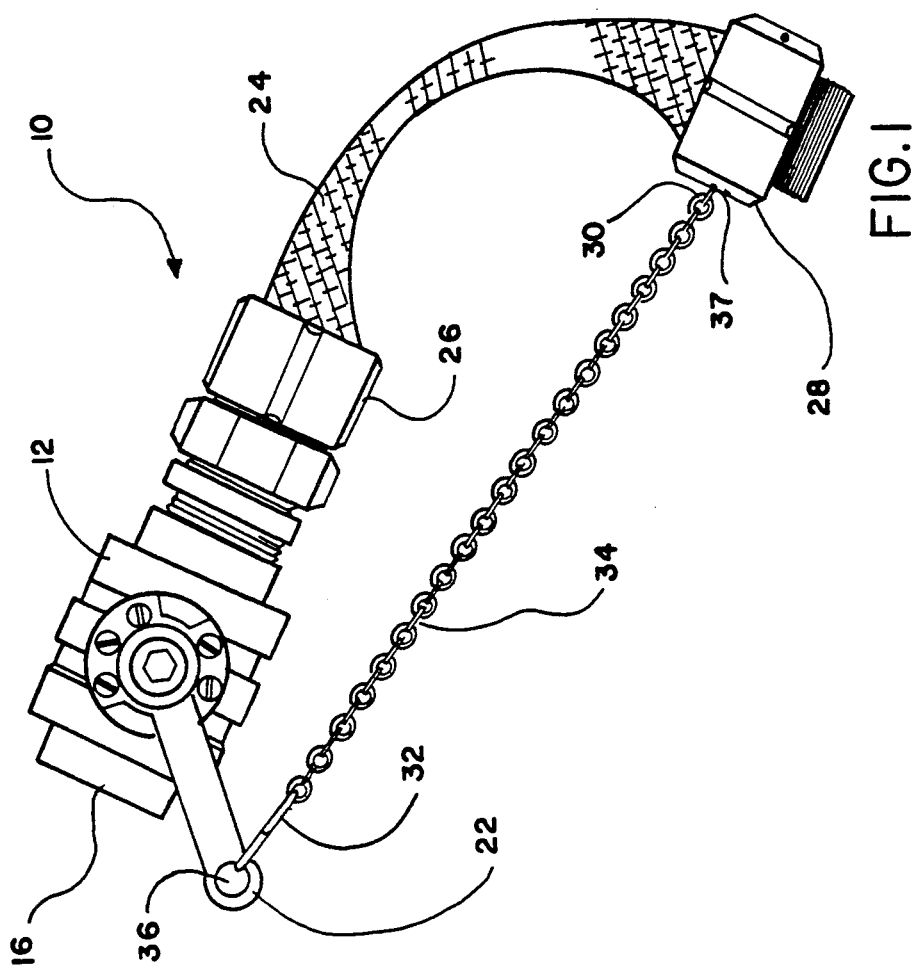
FIG. 1 is a side elevational view of a valve assembly in a closed position.
Figure 5:
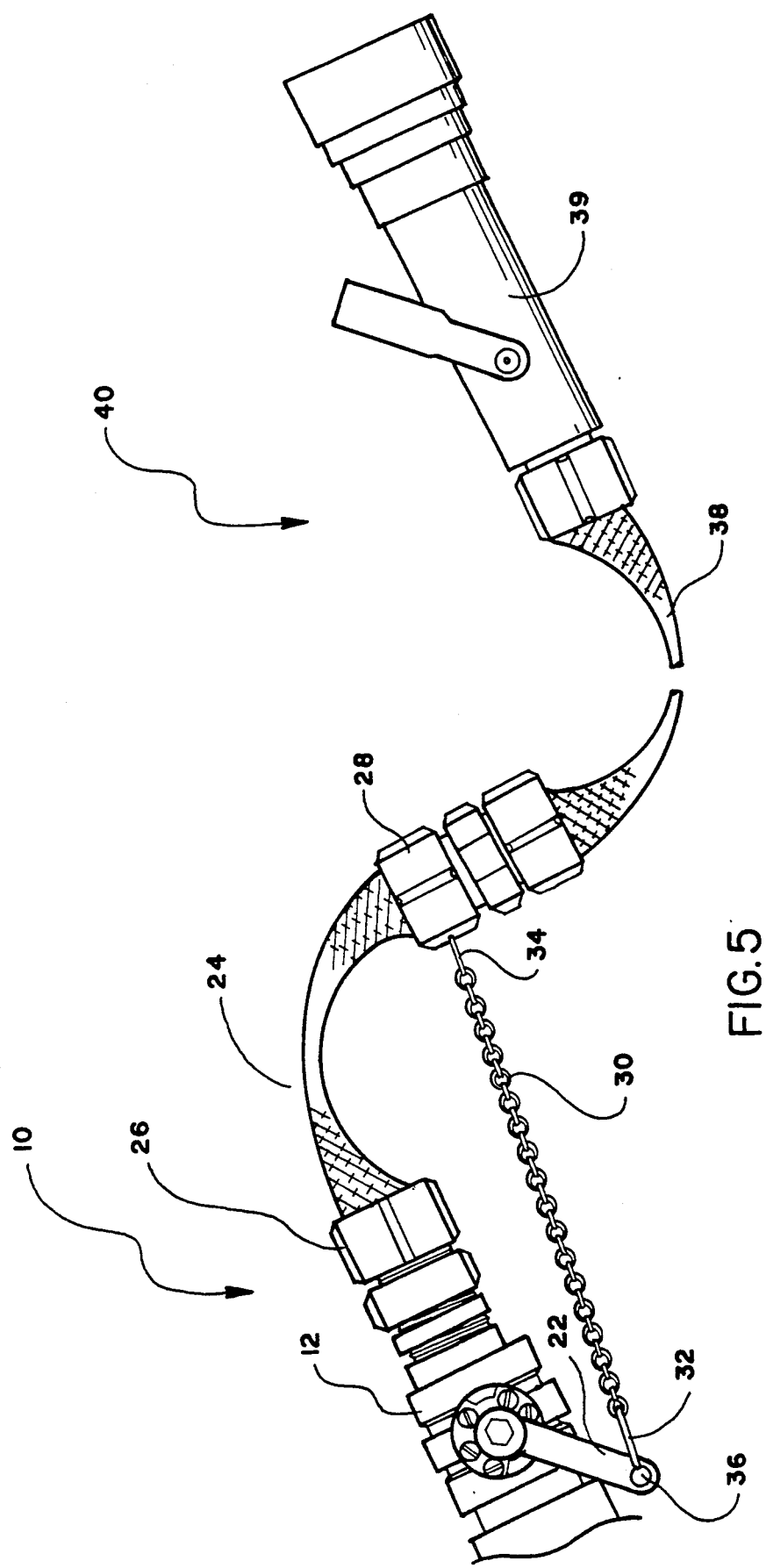
FIG. 5 is an environmental side elevational view of high pressure delivery system.

The present invention is a valve assembly 10, as shown in FIGS. 1, 3, and 5, for use in controlling the flow of high pressure fluid (not shown) from a fluid source S (see FIG. 5). The valve assembly 10 comprises a body 12 which has a bore 14 (see FIG. 2 and 4). The body 12 also has a valve inlet opening 16 and a valve outlet opening 18, both being in communication with the bore 14.

A valve 20 is disposed within the bore 14. The valve 20 may be orientated to a closed position (see FIG. 2) and an open position (see FIG. 4) by a control lever 22 which is fixedly attached to the valve 20.

A transfer-hose 24 has a first coupling 26 removeably attached to the body 12, proximal to the valve outlet opening 18. The transfer-hose 24 has a second coupling 28 distal from the first coupling 26. The transfer-hose 24 is capable of safely transferring a high pressure fluid from the fluid source S (see FIG. 5). The preferred fluid is water, maximally pressurized to 250 pounds per square inch. The valve inlet opening 16 is to have access the fluid source S. Upon a partial opening of the valve 20, the high pressure fluid therefrom assists in opening the valve 20 the remainder of the way. Thus, a maximal flow rate through the valve assembly 10 is automatically reached.

A linkage 30, such as the chain shown, attaches to and extends from a releasable ring 32 on the control lever 22 to a fixed ring 34 on the second coupling 28. The releasable ring 32 attaches the linkage 30 to an eyelet 36 at the end of the control lever 22. The fixed ring 34 attaches the linkage 30 to a ring holder 37 integral to the second coupling 28.

The control lever 22, external to the body 12, is in direct communication with the valve 20. The valve 20 is internal to the body 12 and disposed in the center of the bore 14. The control lever 22 has an exposed portion which acts as a handle and is graspable by a user's hand. The control lever 22 may be used to selectively orient the valve 20 to the closed position, as diagrammatically shown in FIG. 2, through the open position, as diagrammatically shown in FIG. 4. At the end of the control lever 22 is the eyelet 36 to which the releasable ring 32 is attached.

Initially, the valve 20 is in the closed position, as shown in FIG. 1. A displacement of the second coupling 28 away from the body 12, in turn, displaces the linkage 30 and the control lever 22 to open the valve 20.

An extension-hose 38 is attached to the valve assembly 10 as through the second coupling 28. A nozzle 39 and the extension-hose 38 form an attack hoseline 40. The valve assembly 10 is attached to the attack hoseline 40 by the second coupling 28.

A initial tug or force upon the attack hoseline 40 actuates the valve assembly 10 and begins a process whereby high pressure fluid enters into the valve assembly 10 and through the attack hoseline 40. The nozzle 39 acts as a cap to the internal volume of the attack hoseline 40.

The continued flow of a high pressure fluid into the attack hoseline 40 increases the internal fluid pressure. The valve assembly 10 responds with a displacement of the orientation of the transfer-hose 24, resulting in a displacement of the linkage 30 which, in turn, actuates the control lever 22 and the valve 20. Thus, the transfer-hose 24 orients from a limp or contracted orientation (see FIG. 1) to a substantially rigid and linear orientation (see FIG. 3). The high pressure fluid assists in opening the valve 20. The high pressure fluid continues to open the valve 20 until the valve 20 reaches a completely open position, where the high pressure fluid flowing therethrough reaches its maximum flow rate.

It is to be understood that the present invention is not limited to the sole embodiment described above, but encompasses any and all embodiments within the scope of the following claims.

I claim:

1. A valve assembly for use in a high pressure fluid flow system, comprising:
    a body defining a first longitudinal axis, said body having a bore, an inlet opening, and an outlet opening, said inlet opening and said outlet opening being in communication with said bore;
    a valve being movably disposed within said bore;
    a lever fixedly attached to said valve, said lever being operable to displace said valve between a first position and a second position;
    a transfer-hose having a first end having first coupling attached thereto, and a second end having a second coupling attached thereto, said first coupling being attachable to said body adjacent said outlet opening; and
    a linkage extending from said lever to said second coupling, said linkage being operable in response to a displacement of said second coupling, said second coupling being displaceable to stress said linkage to define a second longitudinal axis, the second longitudinal axis being displaceable between a first position and second position, the first position of said second longitudinal axis being divergent relative to the first longitudinal axis and the second position of the second longitudinal axis being convergent relative to the first longitudinal axis.

2. The valve assembly according to claim 1, wherein said transfer-hose is structured and configured to conduct high pressure fluid flow therethrough, said transfer-hose includes a flexible tubular member, said flexible tubular member being displaceable to displace said second coupling between the first and second positions in response to the high pressure fluid flow within said flexible tubular member.

3. The valve assembly according to claim 2, wherein said transfer-hose is structured and configured to be limp in absence of high pressure fluid flow in said transfer-hose and to be distended in response to the high pressure fluid flow in said transfer-hose, said second coupling being in the first position in absence of high pressure fluid flow in said transfer-hose, and said second coupling being displaceable to the second position in the presence of high pressure fluid flow in said transfer-hose.

4. The valve assembly according to claim 1, wherein said bore adjacent said inlet opening has means for coupling said valve assembly to a source of high pressure fluid.

5. The valve assembly according to claim 1, wherein said body, said transfer-hose, and said couplings having means for providing a sealed internal flow passageway for high pressure fluid flow to pass therethrough.

6. The valve assembly according to claim 1, wherein said linkage is structured and configured to be flexible and resist stress deformation, and wherein said linkage is a predetermined length to displace said lever a predetermined amount in response to a predetermined displacement of said second coupling.

7. The valve assembly according to claim 1, wherein said lever is structured and configured to be graspable by a user's hand and is operable locally to displace said valve between the first and second position.

8. The valve assembly according to claim 1, further including means for releasably attaching said linkage to said lever.

9. The valve assembly according to claim 1, wherein said linkage includes a chain.

10. The valve assembly according to claim 1, further having an extension-hose for use in conducting high pressure fluid flow to a remote location, said extension-hose having a first end and a second end, said first end being attachable to said second coupling.

11. The valve assembly according to claim 10, wherein said extension-hose further includes a fluid releasable nozzle attached to said second end thereof, said fluid releasable nozzle controlling the high pressure fluid flow to passing through said extension-hose.

12. A valve assembly for use in a high pressure fluid flow system, comprising:
  a body defining a first longitudinal axis, said body having a substantially cylindrical bore passing therethrough, said body further including an inlet opening and an outlet opening, said inlet opening and said outlet opening being in communication with said bore;
  a valve disposed within said bore and being selectively movable to a closed position and an open position;
  a control lever fixedly attached to said valve, said control lever being operable to displace said valve between the closed position and the open position;
  a transfer-hose having a proximal end having a first coupling attached thereto, and a distal end having a second coupling attached thereto, said first coupling being attachable to said body adjacent said outlet opening; and
  a linkage extending from said lever to said second coupling, said linkage being operable in response to a displacement of said second coupling, said second coupling being displaceable to stress said linkage to define a second longitudinal axis, the second longitudinal axis being displaceable between a first position and second position, the first position of said second longitudinal axis being divergent relative to the first longitudinal axis and the second position of the second longitudinal axis being convergent relative to the first longitudinal axis.

13. The valve assembly according to claim 12, wherein said transfer-hose is structured and configured to conduct high pressure fluid flow therethrough, said transfer-hose includes a flexible tubular member, said flexible tubular member being displaceable to displace said second coupling between the first and second positions in response to the high pressure fluid flow within said flexible tubular member.

14. The valve assembly according to claim 13, wherein said transfer-hose is structured and configured to be limp in absence of high pressure fluid flow in said transfer-hose and to be distended in response to the high pressure fluid flow in said transfer-hose, said second coupling being in the first position in absence of high pressure fluid flow in said transfer-hose, and said second coupling being displaceable to the second position in the presence of high pressure fluid flow in said transfer-hose.

15. The valve assembly according to claim 12, wherein said bore adjacent said inlet opening has means for coupling said valve assembly to a source of high pressure fluid.

16. The valve assembly according to claim 12, said body, said transfer-hose, and said couplings having means for providing a sealed internal flow passageway for high pressure fluid flow to pass therethrough.

17. The valve assembly according to claim 12, wherein said linkage is structured and configured to be flexible and resist stress deformation, and wherein said linkage is a predetermined length to displace said lever a predetermined amount in response to a predetermined displacement of said second coupling.

18. The valve assembly according to claim 12, wherein said control lever is structured and configured to include an exposed portion graspable by a user's hand and operable locally to displace said valve between the first and second position.

19. The valve assembly according to claim 12, wherein said control lever includes means defining an eyelet, and wherein said linkage includes a releasable ring attached thereto, said releasable ring including means for biasing said releasable ring, said releasable ring being releasably attachable to said eyelet means.

20. A valve assembly for use in a high pressure fluid flow system, comprising:
  a body defining a first longitudinal axis, said body having a substantially cylindrical bore passing therethrough, said body further including an inlet opening and an outlet opening opposite said inlet opening, said inlet opening and said outlet opening being in communication with said bore, said body further having means for coupling said body to a source of high pressure fluid;
  a valve disposed within said bore, said valve selectively movable to a closed position and an open position;
  a control lever fixedly attached to said valve, said control lever being operable to displace said valve between the closed position and the open position;
  a transfer-hose having a proximal end having a first coupling attached thereto, and a distal end having a second coupling attached thereto, said first coupling being attachable to said body adjacent said outlet opening, said transfer-hose being structured and configured to conduct high pressure fluid flow therethrough, said transfer-hose further including a flexible tubular member, said flexible tubular member being displaceable to displace said second coupling between the first and second positions in response to the high pressure fluid flow within said flexible tubular member, said transfer-hose further being structured and configured to be limp in absence of high pressure fluid flow in said transfer-hose and to be distended in response to the high pressure fluid flow in said transfer-hose;
  a linkage extending from said lever to said second coupling, said linkage being operable in response to a displacement of said second coupling, said second coupling being displaceable to stress said linkage to define a second longitudinal axis, the second longitudinal axis being displaceable between a first position and second position, the first position of said second longitudinal axis being divergent relative to the first longitudinal axis and the second position of the second longitudinal axis being convergent relative to the first longitudinal axis, said linkage being structured and configured to be flexible and resist stress deformation and being a predetermined length to displace said lever a predetermined amount in response to a predetermined displacement of said second coupling.

* * * * *